(12) United States Patent
Kelso et al.

(10) Patent No.: US 11,299,228 B2
(45) Date of Patent: Apr. 12, 2022

(54) AERODYNAMICS OF BICYCLE FRAMES AND ASSOCIATED COMPONENTS

(71) Applicant: The University of Adelaide, Adelaide (AU)

(72) Inventors: Richard Malcolm Kelso, Walkerville (AU); Henry James Atkins, St. Morris (AU); Shaun James Fitzgerald, Stonyfell (AU)

(73) Assignee: The University of Adelaide, Adelaide (AU)

( * ) Notice: Subject to any disclaimer, the term of this patent is extended or adjusted under 35 U.S.C. 154(b) by 130 days.

(21) Appl. No.: 16/319,288

(22) PCT Filed: Jul. 21, 2017

(86) PCT No.: PCT/AU2017/000153
§ 371 (c)(1),
(2) Date: Jan. 18, 2019

(87) PCT Pub. No.: WO2018/014070
PCT Pub. Date: Jan. 25, 2018

(65) Prior Publication Data
US 2019/0276105 A1    Sep. 12, 2019

(30) Foreign Application Priority Data

Jul. 22, 2016 (AU) .................... 2016902895

(51) Int. Cl.
*B62K 3/02* (2006.01)
*B62J 1/08* (2006.01)
(Continued)

(52) U.S. Cl.
CPC ...... *B62K 3/02* (2013.01); *B62J 1/08* (2013.01); *B62J 17/10* (2020.02); *B62K 19/02* (2013.01); *B62K 21/02* (2013.01); *B62K 21/12* (2013.01)

(58) Field of Classification Search
CPC ... B62J 17/00; B62J 17/10; B62J 1/08; B62K 3/02; B62K 19/02; B62K 21/02; B62K 21/12
See application file for complete search history.

(56) References Cited

U.S. PATENT DOCUMENTS

| 5,860,626 | A | 1/1999 | Moser |
| 7,967,315 | B2 * | 6/2011 | Soucek ............... B62K 19/02 280/274 |

(Continued)

FOREIGN PATENT DOCUMENTS

| TW | M349880 | * | 2/2009 | ............ B62K 19/30 |
| WO | WO-2014026246 A1 | * | 2/2014 | ............... B64C 3/14 |

OTHER PUBLICATIONS

English Translation of TW M349880, Provided by espacenet.com (Year: 2009).*

(Continued)

*Primary Examiner* — Minnah L Seoh
*Assistant Examiner* — Harold Eric Pahlck, III
(74) *Attorney, Agent, or Firm* — Christensen O'Connor Johnson Kindness PLLC

(57) ABSTRACT

The present disclosure relates to a bicycle frame and associated bicycle components, and to reducing the aerodynamic drag of these. In one aspect, there is provided an elongate structural member of a bicycle frame, the member comprising a lengthwise extending leading edge, the leading edge comprising at least a pair of forwardly extending protrusions spaced apart lengthwise therealong. In one form, the protrusions comprise tubercles, a series of which are spaced apart lengthwise along the leading edge, and which further extend to at least one side of the leading edge so as to transition into a chordwise extending rib.

19 Claims, 18 Drawing Sheets

Frame - elevation view

(51) Int. Cl.
  *B62K 21/12* (2006.01)
  *B62K 21/02* (2006.01)
  *B62K 19/02* (2006.01)
  *B62J 17/10* (2020.01)

(56) References Cited

U.S. PATENT DOCUMENTS

| | | | |
|---|---|---|---|
| 9,120,518 B2 * | 9/2015 | Janssen | B62K 19/36 |
| 9,725,129 B2 * | 8/2017 | Poole | B62K 21/125 |
| 2006/0060721 A1 | 3/2006 | Watts et al. | |
| 2009/0236902 A1 * | 9/2009 | Zibkoff | B60B 5/00 301/104 |

OTHER PUBLICATIONS

Espada, D.R., "Aerodynamic Assessment of Humpback Whale Ventral Fin Shapes," Universitat Politecnica de Catalunya, Escola Tècnica Superior d'Enginyeries Industrial i Aeronàutica de Terrassa, 2011, <https://upcommons.upc.edu/handle/2099.1/13814?locale-attribute=en> [retrieved Aug. 11, 2017], 277 pages.

Hansen, K.L., "Effect of Leading Edge Tubercles on Airfoil Performance," Thesis (Jul. 2012), School of Mechanical Engineering, The University of Adelaide, (abstract) <https://digital.library.adelaide.edu.au/dspace/handle/2440/79211> [retrieved Aug. 11, 2017].

International Search Report and Written Opinion dated Aug. 22, 2017, issued in corresponding Application No. PCT/AU2017/000153, filed Jul. 21, 2017, 11 pages.

Rome, D., "Bumpy frame, smooth air: Is this the next big thing in bike aerodynamics? Cycling Tips," <https://cyclingtips.com/2019/10/bumpy-frame-smooth-air-the-next-big-thing-in-bike-aerodynamics> Oct. 16, 2019 [retrieved Feb. 10, 2020], 17 pages.

Walter, P., "Matthew Glaetzer—Matthew Glaetzer Photos—Cycling—Track—Olympics: Day 7—Zimbio," <https://www.zimbio.com/photos/Matthew+Glaetzer/Cycling+Track+Olympics+Day+7/8InzqN2RuvV> Aug. 12, 2016 [retrieved Feb. 10, 2020], 2 pages.

Bolzon, M.D., et al., "Tubercles and Their Applications," Journal of Aerospace Engineering (29)1, Apr. 14, 2015, 10 pages.

Supplementary European Search Report dated Feb. 10, 2020, issued in corresponding European Application No. 17830102.4, filed Jul. 21, 2017, 3 pages.

\* cited by examiner

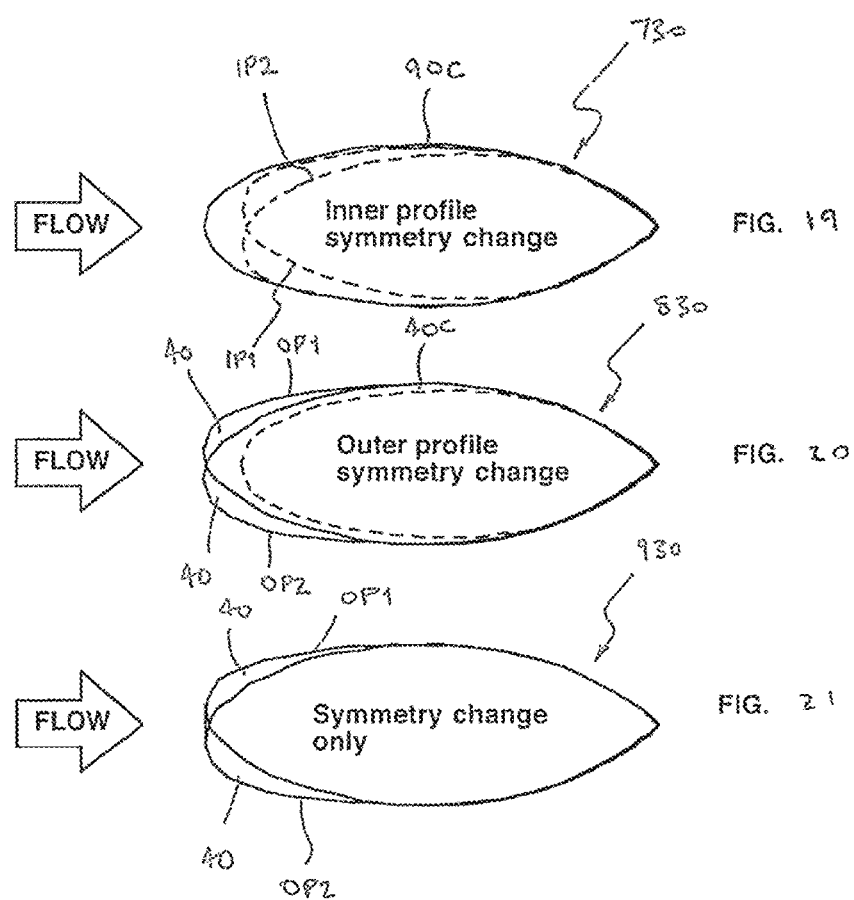

Frame - elevation view

Handlebars - Plan view

AERODYNAMICS OF BICYCLE FRAMES AND ASSOCIATED COMPONENTS

PRIORITY DOCUMENTS

The present application is a National Stage of International Application No. PCT/AU2017/000153 filed on 21 Jul. 2017 which claims priority from Australian Provisional Patent Application No. 2016902895 titled "IMPROVEMENTS TO THE AERODYNAMICS OF BICYCLE FRAMES AND ASSOCIATED COMPONENTS" and filed on 22 Jul. 2016, the contents of which are hereby incorporated by reference in their entirety.

TECHNICAL FIELD

The present disclosure relates to a bicycle frame, and associated bicycle components. In a particular form the present disclosure relates to decreasing the aerodynamic drag of a bicycle frame, and associated bicycle components.

BACKGROUND

In competitive cycling, the reduction of drag on a cyclist's body or the bicycle itself can improve the speed and performance of the cyclist. One means of reducing the total aerodynamic drag is to reduce the drag of bicycle components.

It has long been recognised that the drag of the bicycle frame, forks and seat post is a significant contributor to the drag of the bicycle. For this reason, bicycles that are designed to produce low levels of drag, such as time-trial bicycles or track racing bicycles, typically have components with narrow cross-sections that resemble the shape of a thick aerofoil. The International Cycling Union (UCI) rules state that the chord-to-thickness ratio of the bicycle's structural elements must not be greater than 3. (Note that as of January 2017 this restriction has been relaxed for some frame components.) However, a length-to-thickness of between 3.7 and 9 is required for minimum drag at Reynolds numbers (based on section chord) between 1,000 and 1,000,000, as described in Hoerner (Sighard F. Hoerner, Fluid-dynamic drag: practical information on aerodynamic drag and hydrodynamic resistance, 2nd Edition, Hoerner Fluid Dynamics, 1965).

The Reynolds numbers of the front forks, frame and seat post of a bicycle are sufficiently low that under normal riding conditions the boundary layers are laminar, and this results in boundary layer separation at yaw angles as low as 5 degrees when conventional cross-sectional shapes are used. When boundary layer separation occurs, the flow is described as separated or stalled, and the drag is increased.

Recent tests conducted by the inventors of a track bicycle on an indoor velodrome demonstrate that movement of the rider's legs alone can cause cyclic flow angle variations around the seat post and seat tube which exceed ±20 degrees. It was also found that for a road bicycle, where the rider's seat and legs are disposed further towards the rear of the bicycle, the cyclic yaw angle variations can exceed ±30 degrees. Furthermore, measurements by the inventors demonstrate that the flow angles experienced by a bicycle following closely behind another bicycle exceed 40 degrees.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect of the present disclosure, there is provided a bicycle frame comprising at least one elongate frame member comprising a lengthwise extending leading edge, the leading edge comprising at least a pair of vortex generators spaced apart lengthwise therealong.

In one form, each of the vortex generators comprises a protrusion.

According to a further aspect, there is provided a bicycle frame comprising at least one elongate frame member comprising a lengthwise extending leading edge, the leading edge comprising at least a pair of protrusions spaced apart lengthwise therealong.

In one form, the frame member comprises any one of a seat tube, a head tube, a down tube or a seat stay.

In one form, all of the frame's elongate upright frame members comprise the protrusions.

According to a further aspect, there is provided an elongate frame member of a bicycle frame, the frame member comprising a lengthwise extending leading edge, the leading edge comprising at least a pair of protrusions spaced apart lengthwise therealong.

According to a further aspect, there is provided a seat post for a bicycle, the seat post comprising a lengthwise extending leading edge, the leading edge comprising at least a pair of protrusions spaced apart lengthwise therealong.

According to a further aspect, there is provided a pair of forks for a bicycle, where each of the forks comprises a lengthwise extending leading edge, each leading edge comprising at least a pair of protrusions spaced apart lengthwise therealong.

According to a further aspect, there is provided a pair of handlebars for a bicycle, where each of the handlebars comprises a lengthwise extending leading edge, each leading edge comprising at least a pair of protrusions spaced apart lengthwise therealong.

According to a further aspect, there is provided a handlebar stem for a bicycle, the stem comprising an upright portion comprising a lengthwise extending leading edge, the leading edge comprising at least a pair of protrusions spaced apart lengthwise therealong.

In one form, the leading edge comprises a series of protrusions spaced apart lengthwise therealong.

In one form, an alternating pattern of the protrusions and the spaces extends lengthwise along at least a portion of the leading edge. In one form, the protrusions and the spaces extend lengthwise along an entirety of the leading edge.

In one form, each pair of protrusions is separated by a valley.

In one form, an alternating pattern of the protrusions and the valleys extends lengthwise along at least a portion of the leading edge. In one form, the protrusions and the valleys extend lengthwise along an entirety of the leading edge.

In one form, each of the protrusions extends forwardly from the leading edge.

In one form, in an alternative, each of the protrusions extends to a side of the leading edge. In one form, each of the protrusions extends chordwise.

In one form, each of the protrusions is aerodynamic; that is to say it is shaped to reduce the drag from air moving over it.

In one form, each of the protrusions comprises a convex rounded form. That is to say, in one form each of the protrusions comprises a tubercle.

In one form, each of the protrusions comprises a convex undulation.

In an alternative, the protrusions comprise any one of a conical, triangular, or rectilinear shape.

In one form, each of the spaces comprises a concave undulation.

In one form, each of the valleys comprises a concave undulation.

In one form, each of the protrusions extends either side of the leading edge.

In one form, each of the protrusions extends at least a part way around the member.

In one form, each of the protrusions extends perpendicular to the direction of elongation of the member.

In one form, each of the protrusions extends perpendicular to the direction of elongation of the member.

In one form, each of the protrusions extends at an angle ranging between parallel to and perpendicular to the direction of elongation of the member.

In one form, each of the protrusions extends chordwise, parallel to a direction of airflow thereover.

In one form, each of the valleys extends either side of the leading edge.

In one form, each of the valleys extends at least a part way around the member. In one form, each of the valleys extends chordwise.

In one form, the member comprises an aerofoil shaped cross-sectional profile. In an alternative, the protrusions (tubercles) may be applied to any profile including, but not limited to generally round, oval and D-shaped (Kammback) profiles.

In one form, the member comprises either of a hollow tube or a solid tube. In one form, the member may be made from any appropriate material, including but not limited to: steel, aluminium, titanium, plastics, carbon fibre or other composites.

In one form, protrusions are integrally formed on the member. In another form, the protrusions are attached to the member by any suitable means, including but not limited to glue, screws or rivets. Alternatively, the modifications may be retrofitted as a moulded sleeve that fits over the outside of the member.

According to a further aspect, there is provided a seat post for a bicycle, the seat post comprising a lengthwise extending leading edge, the leading edge comprising a series of forwardly projecting tubercles spaced apart lengthwise therealong.

According to a further aspect, there is provided a bicycle component comprising a lengthwise extending leading edge, the leading edge comprising at least a pair of forwardly extending protrusions spaced apart lengthwise therealong.

For ease of description, bicycles and/or bicycle structural members embodying the present invention are described below in their usual assembled position as shown in the accompanying drawings and terms such as front, rear, upper, lower, horizontal, longitudinal etc., may be used with reference to this usual position. However, the bicycle structural members may be manufactured, transported, sold, or used in orientations other than that described and shown here.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein:

FIG. 19 is a cross-sectional view through a bicycle frame member according to a further embodiment;

FIG. 20 is a cross-sectional view through a bicycle frame member according to a further embodiment;

FIG. 21 is a cross-sectional view through a bicycle frame member according to a further embodiment;

In the following description, like reference characters designate like or corresponding parts throughout the figures.

DESCRIPTION OF EMBODIMENTS

Figure 1:
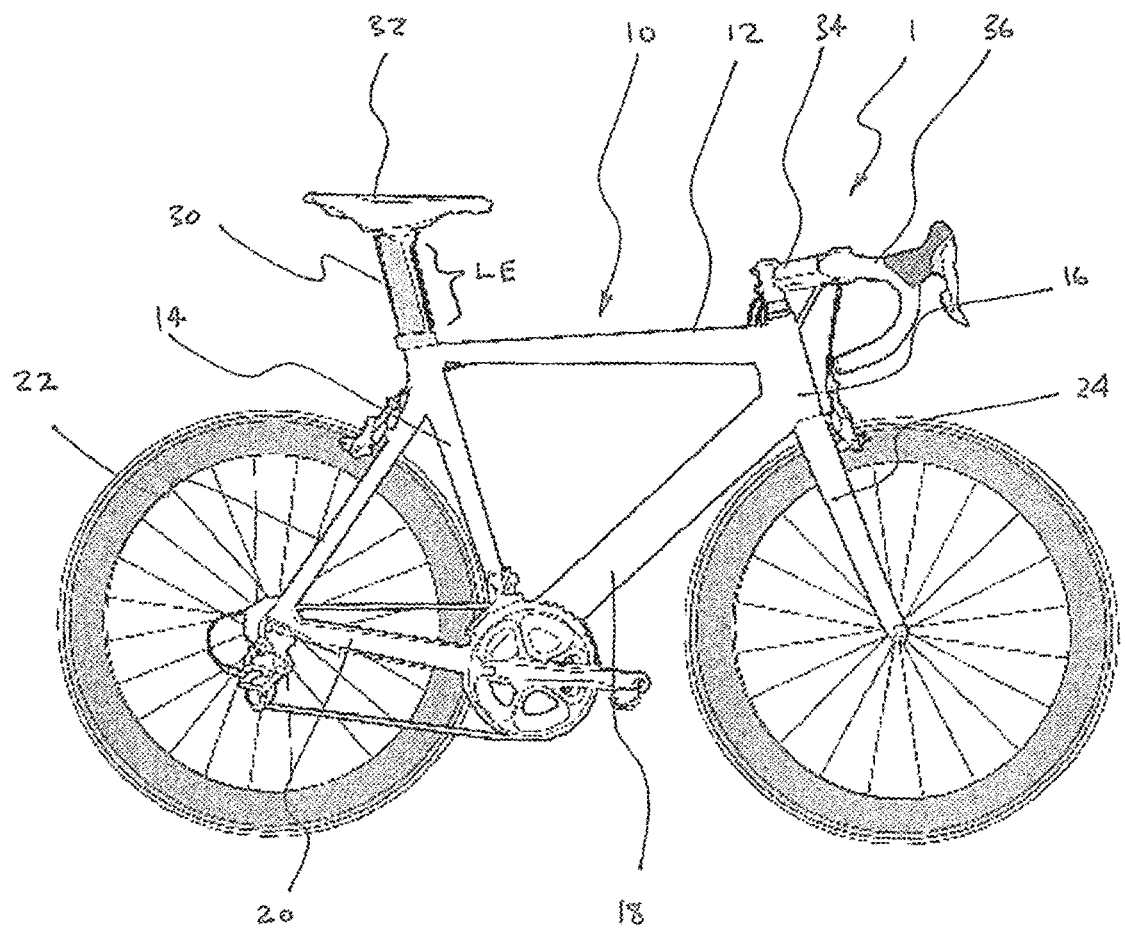
FIG. 1 is a side view of a bicycle comprising a frame.
Figure 2:
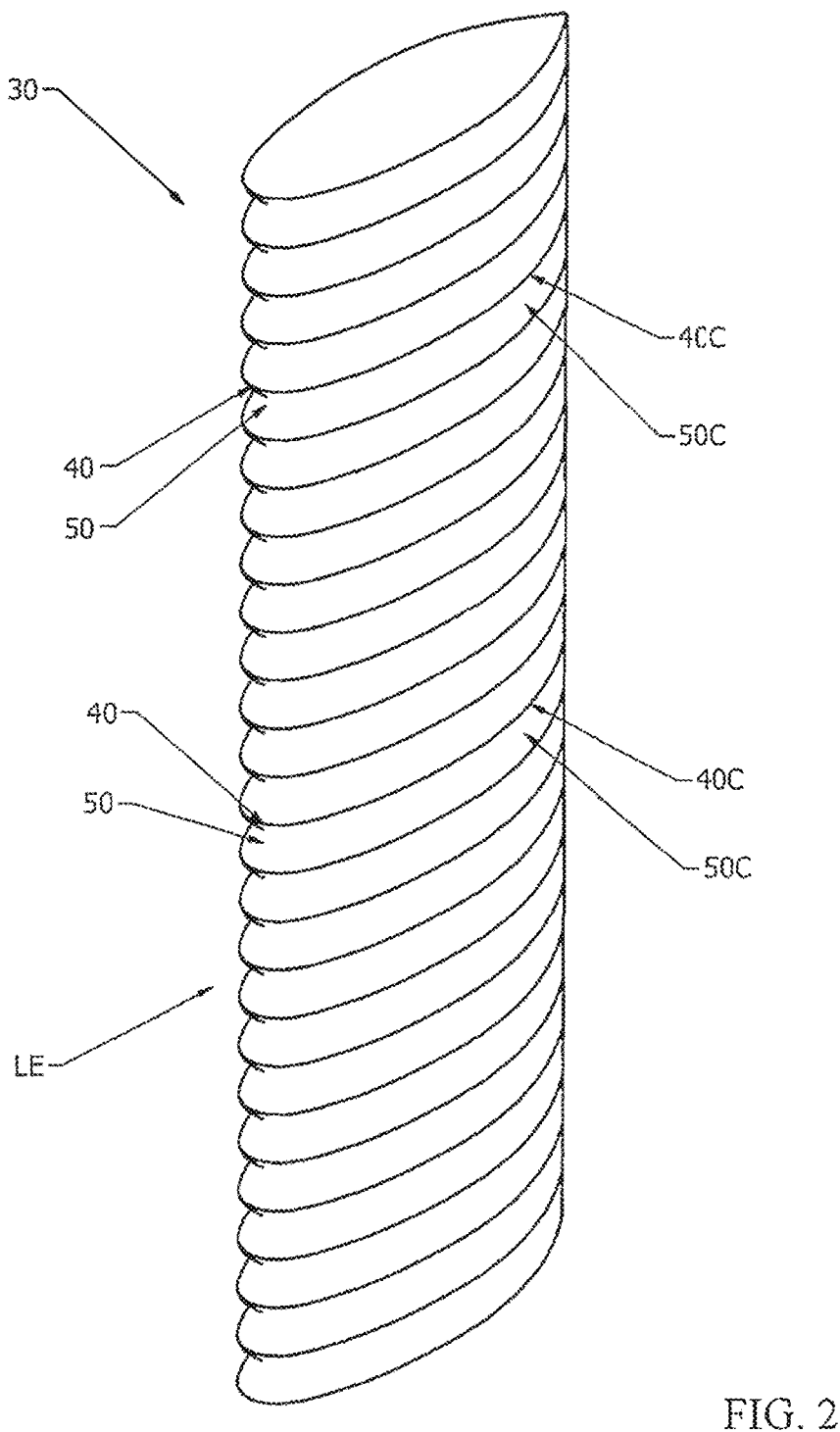
FIG. 2 is a perspective view of a bicycle frame member according to a first embodiment.
Figure 3:
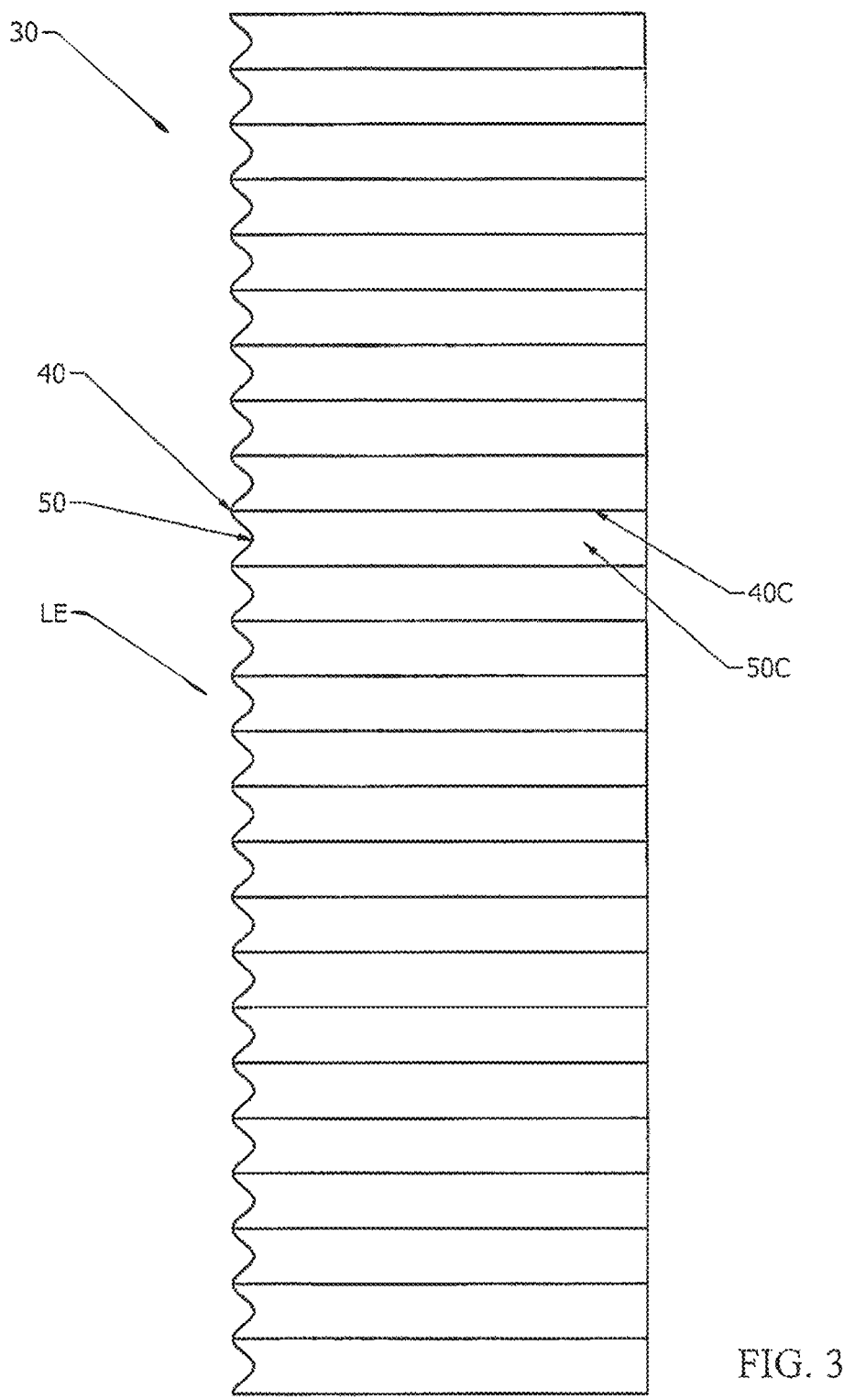
FIG. 3 is a side view of the bicycle frame member of FIG. 2.
Figure 4:
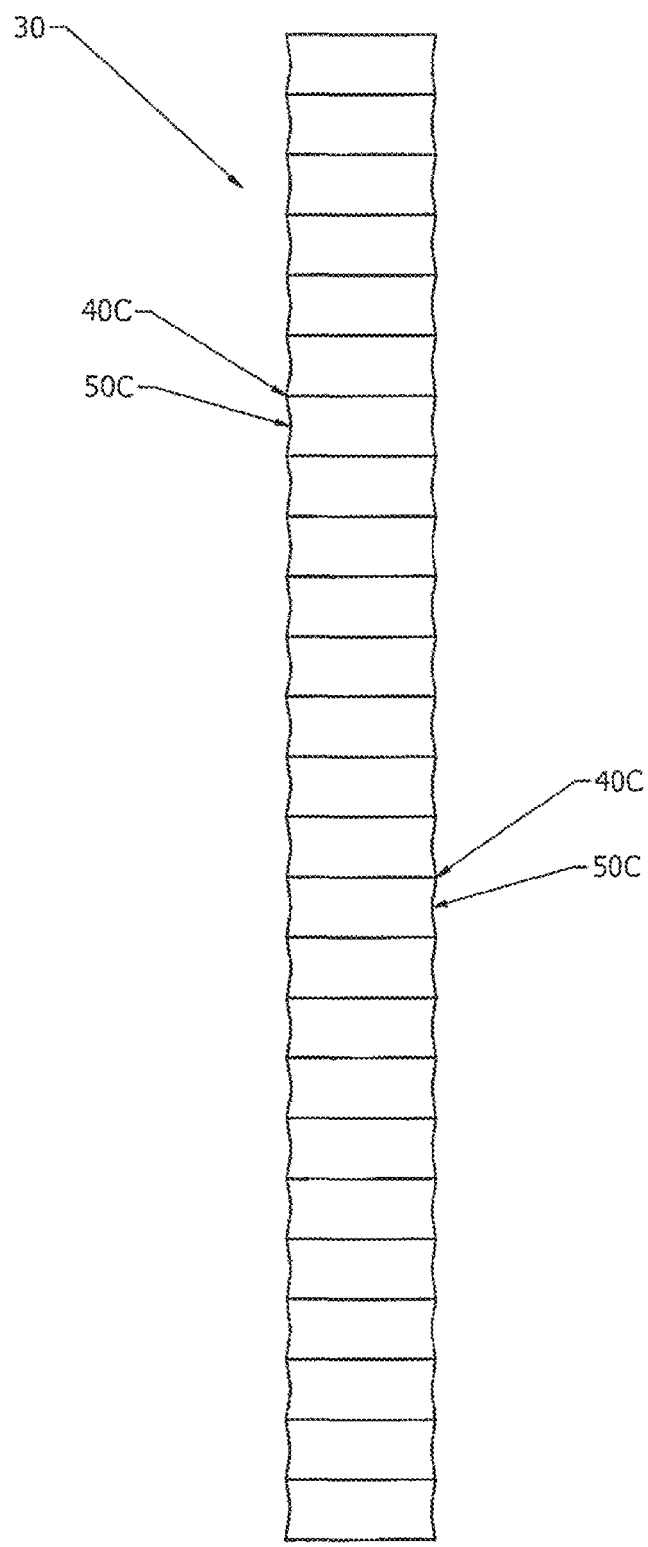
FIG. 4 is a leading edge view of the bicycle frame member of FIG. 2.
Figure 5:
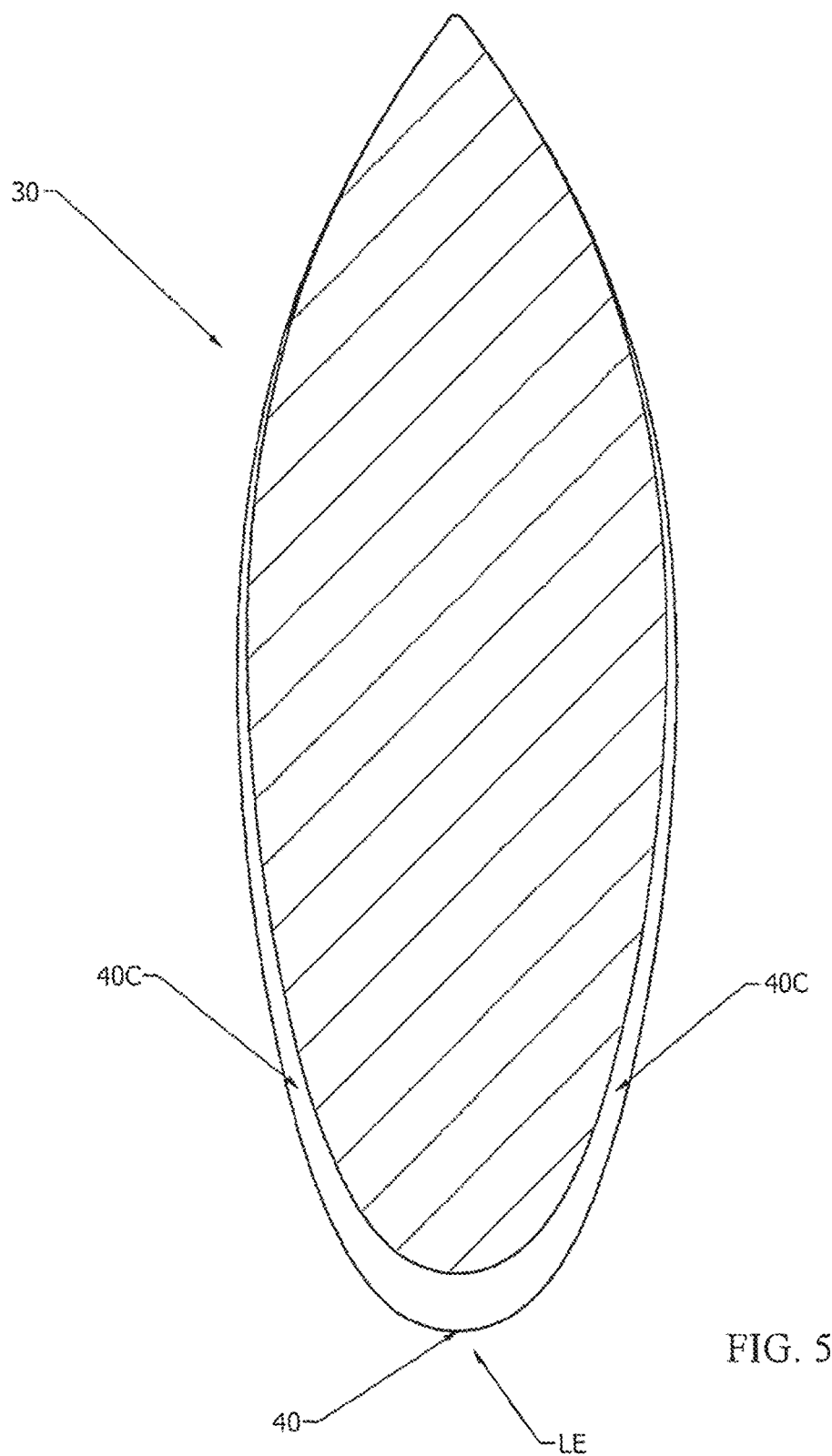
FIG. 5 is a cross-sectional view through the bicycle frame member of FIG. 2.
Figure 6:
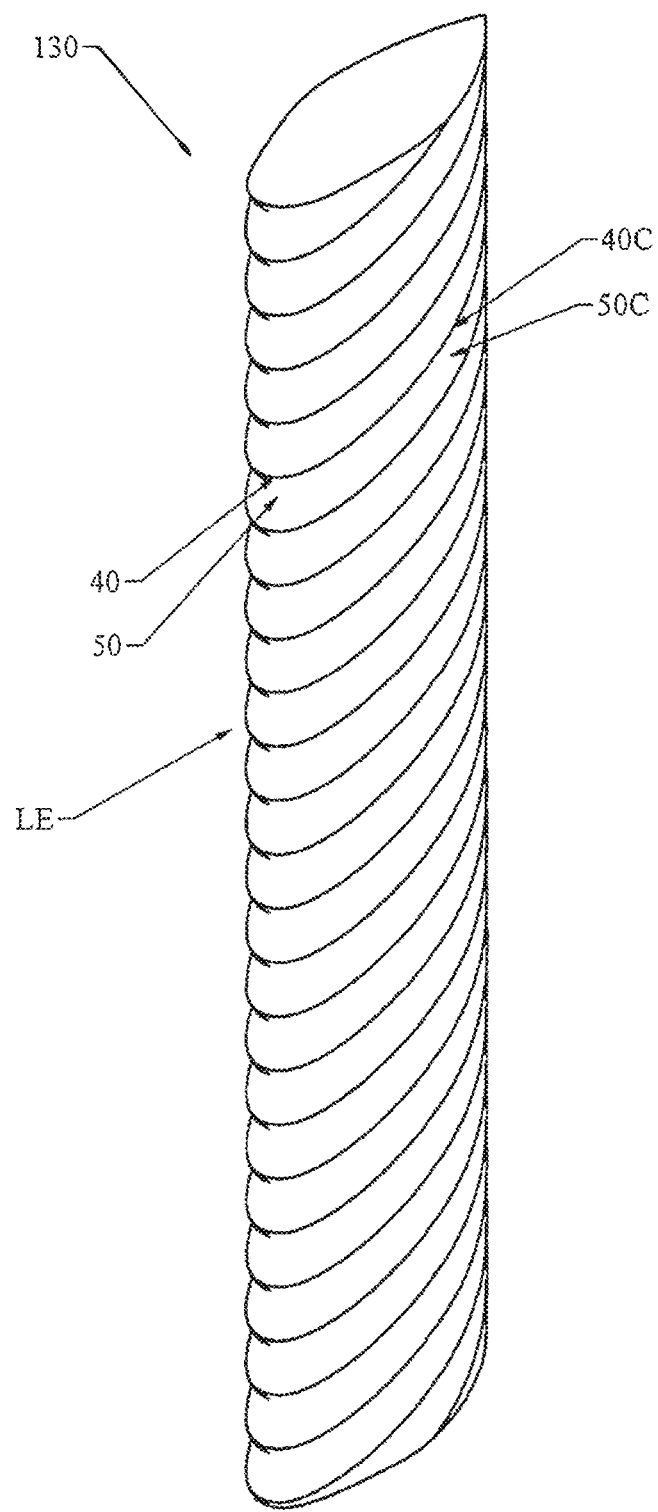
FIG. 6 is a perspective view of a bicycle frame member according to a second embodiment.
Figure 7:
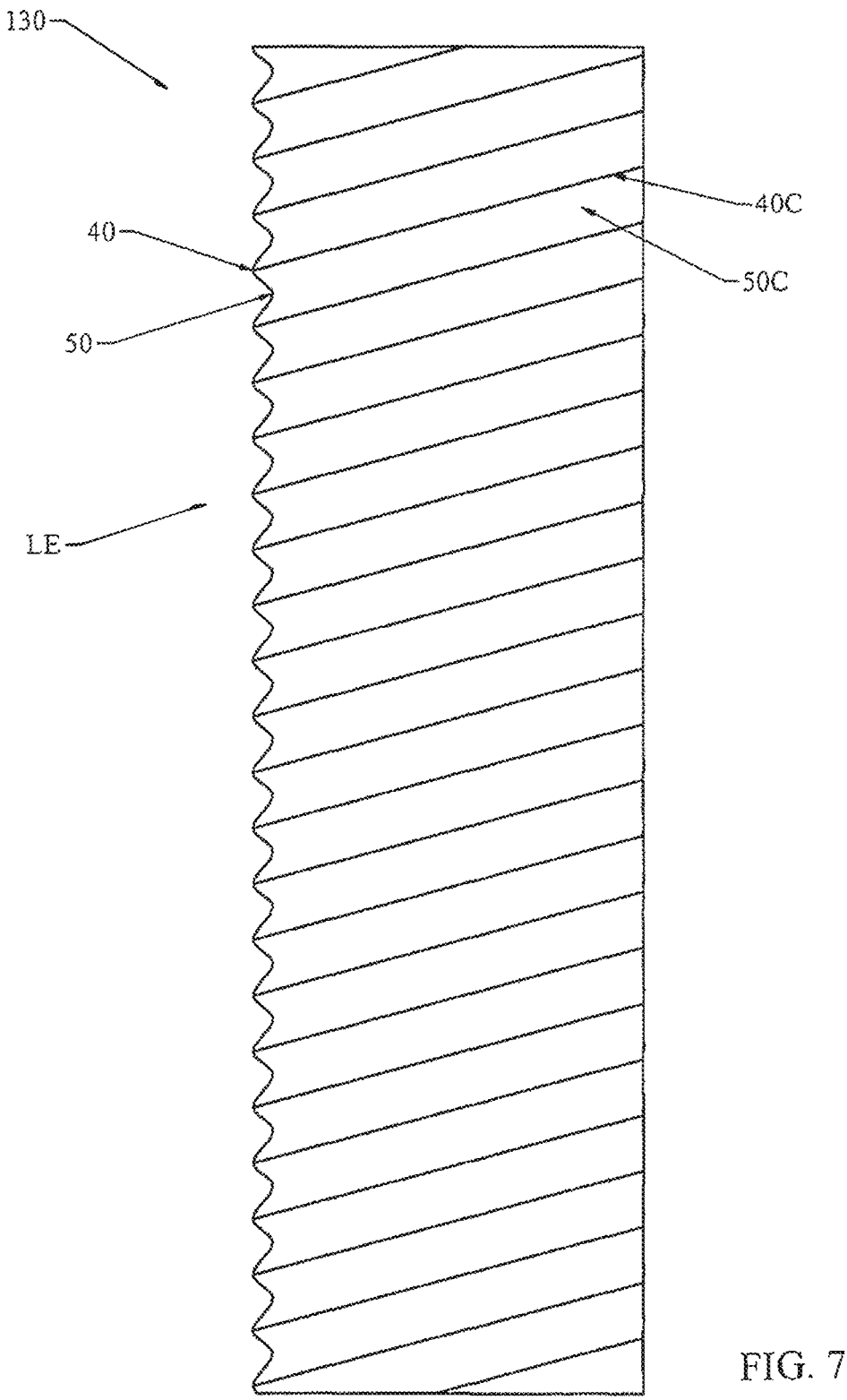
FIG. 7 is side view of the bicycle frame member of FIG. 6.
Figure 8:
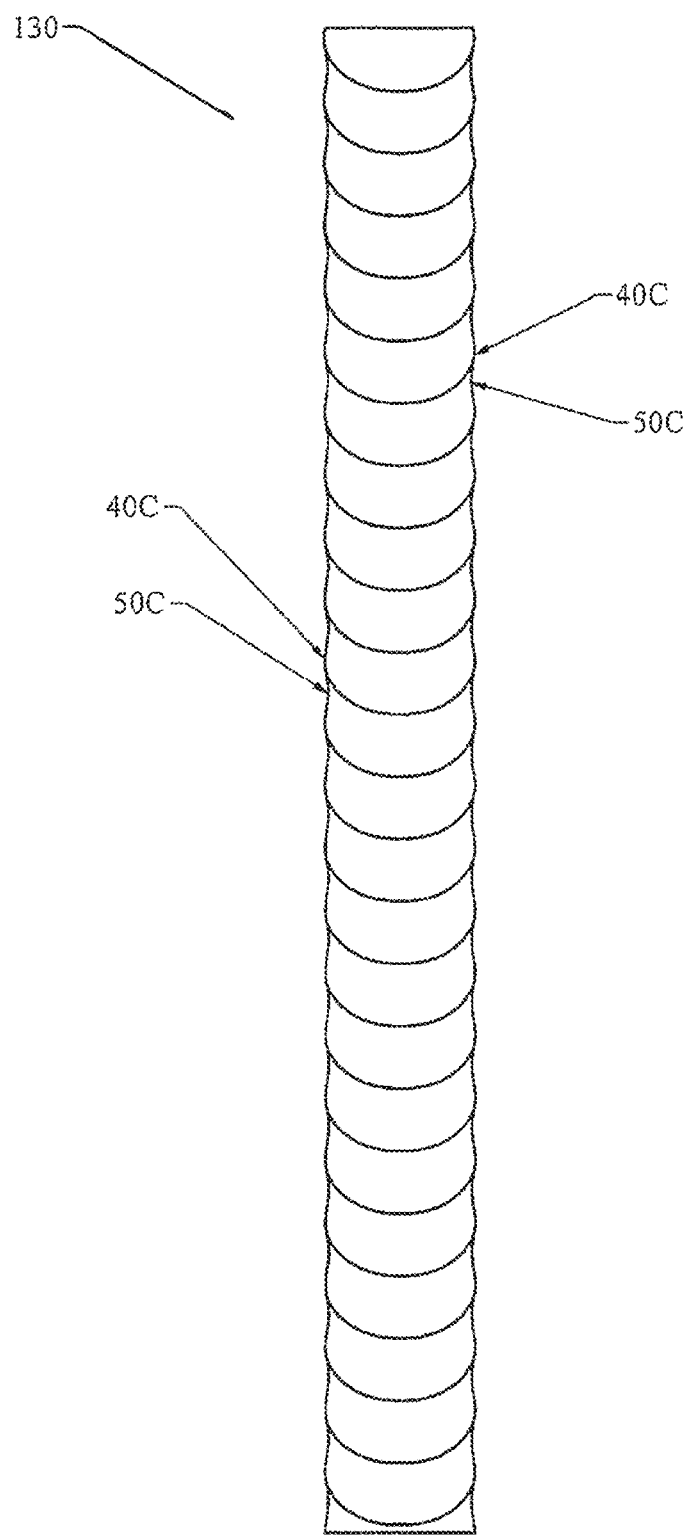
FIG. 8 is a leading edge view of the bicycle frame member of FIG. 6.
Figure 9:
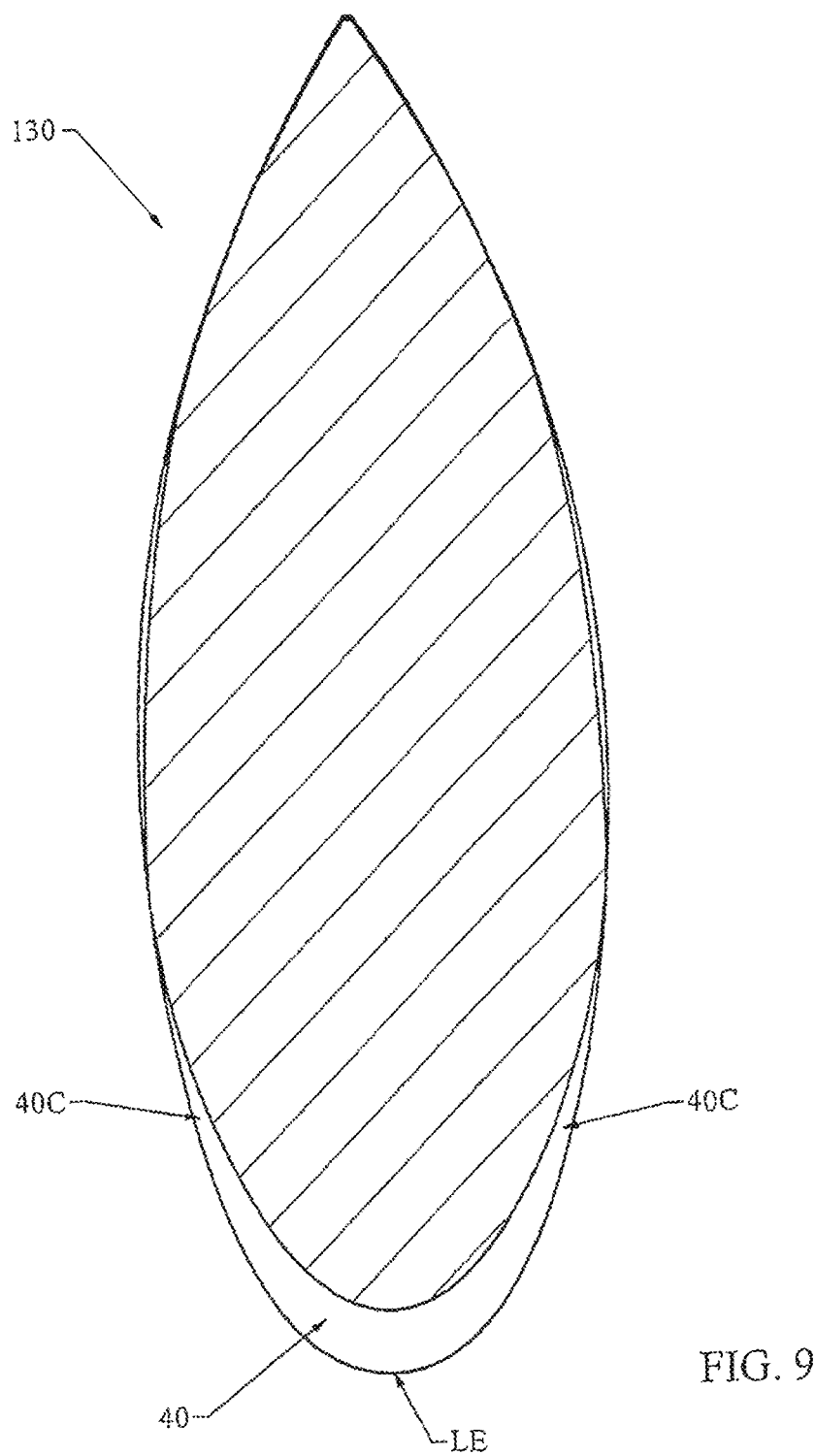
FIG. 9 is a cross-sectional view through the bicycle frame member of FIG. 6.
Figure 10:
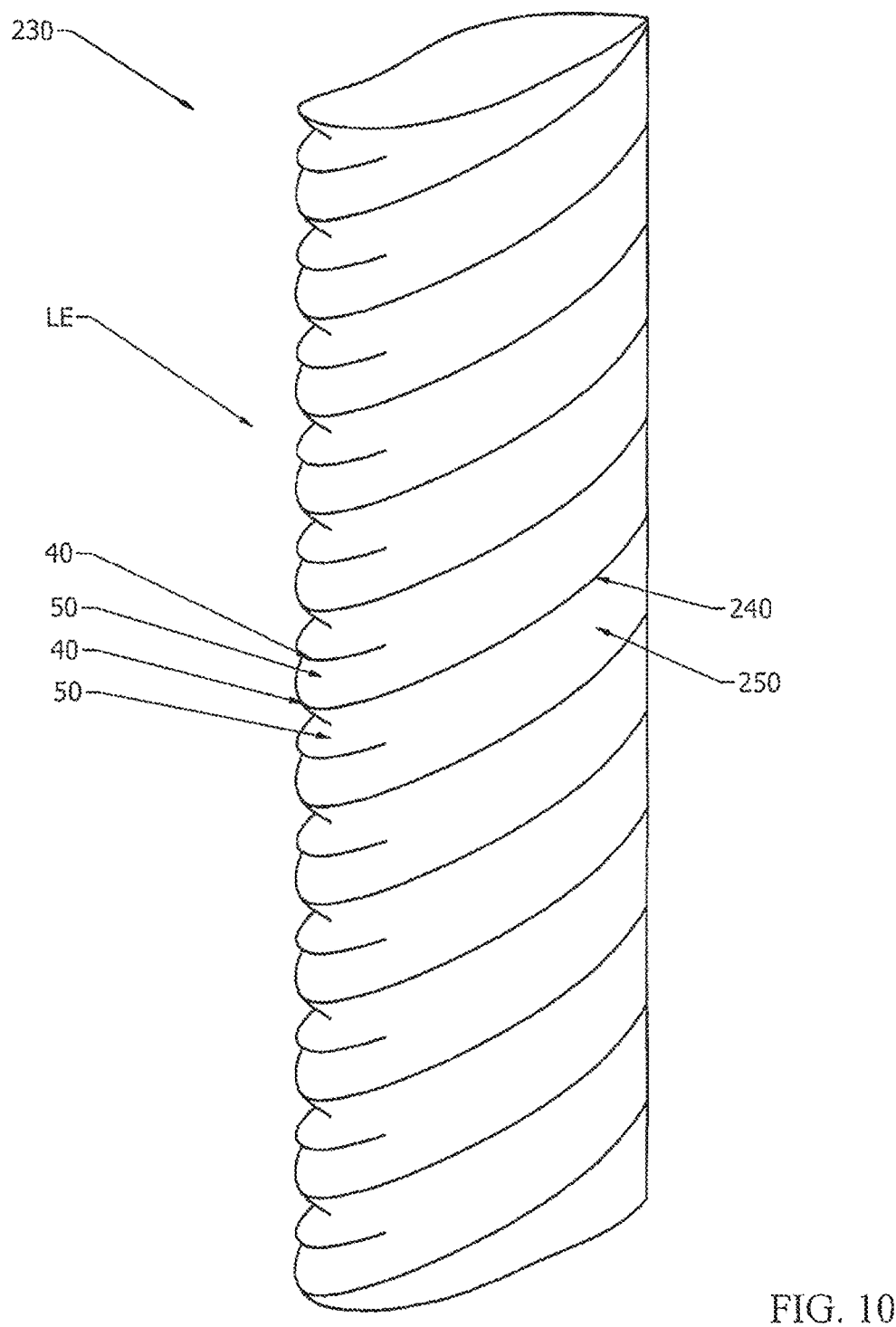
FIG. 10 is a perspective view of a bicycle frame member according to a third embodiment.
Figure 11:
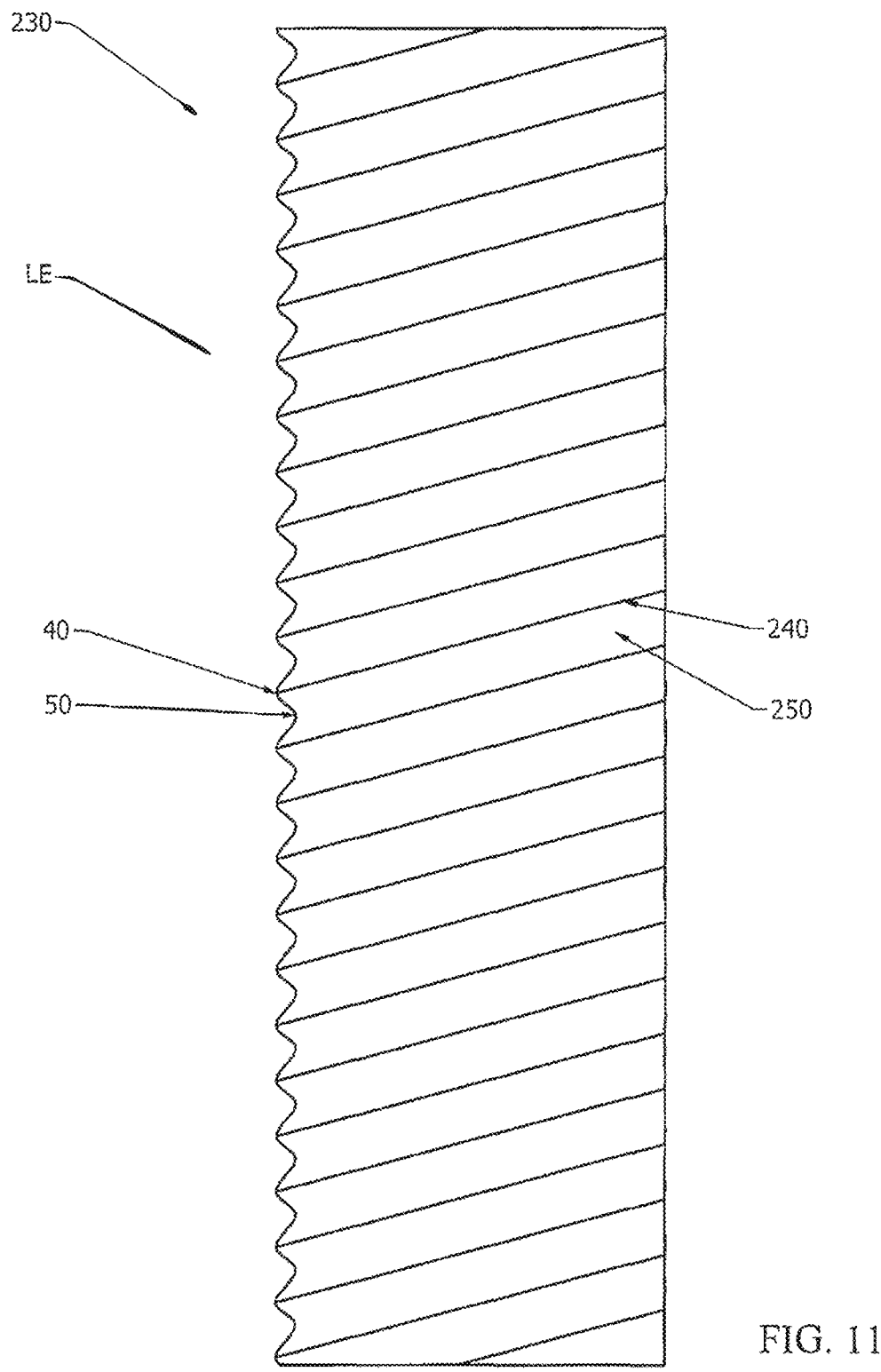
FIG. 11 is side view of the bicycle frame member of FIG. 10.
Figure 12:
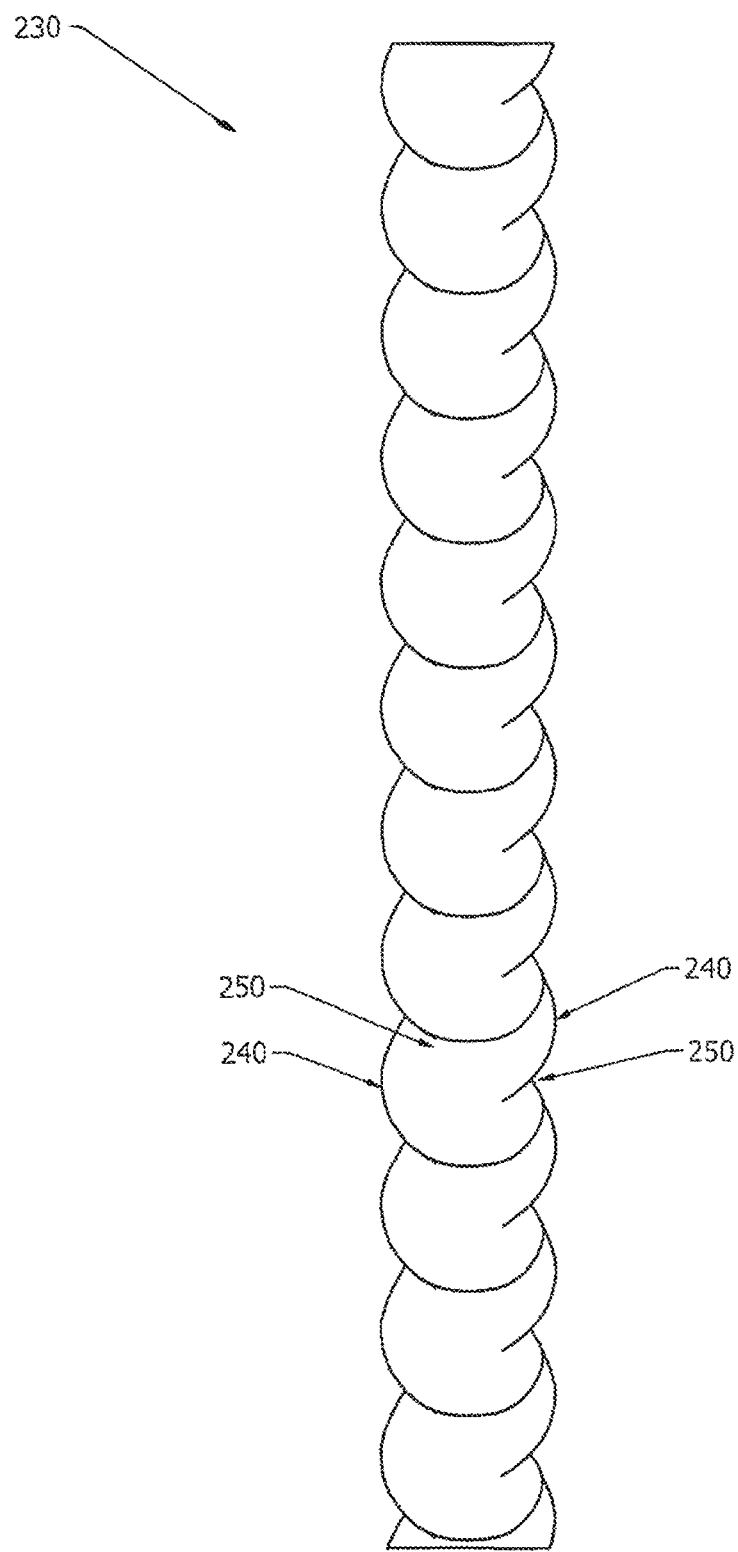
FIG. 12 is a leading edge view of the bicycle frame member of FIG. 10.
Figure 13:
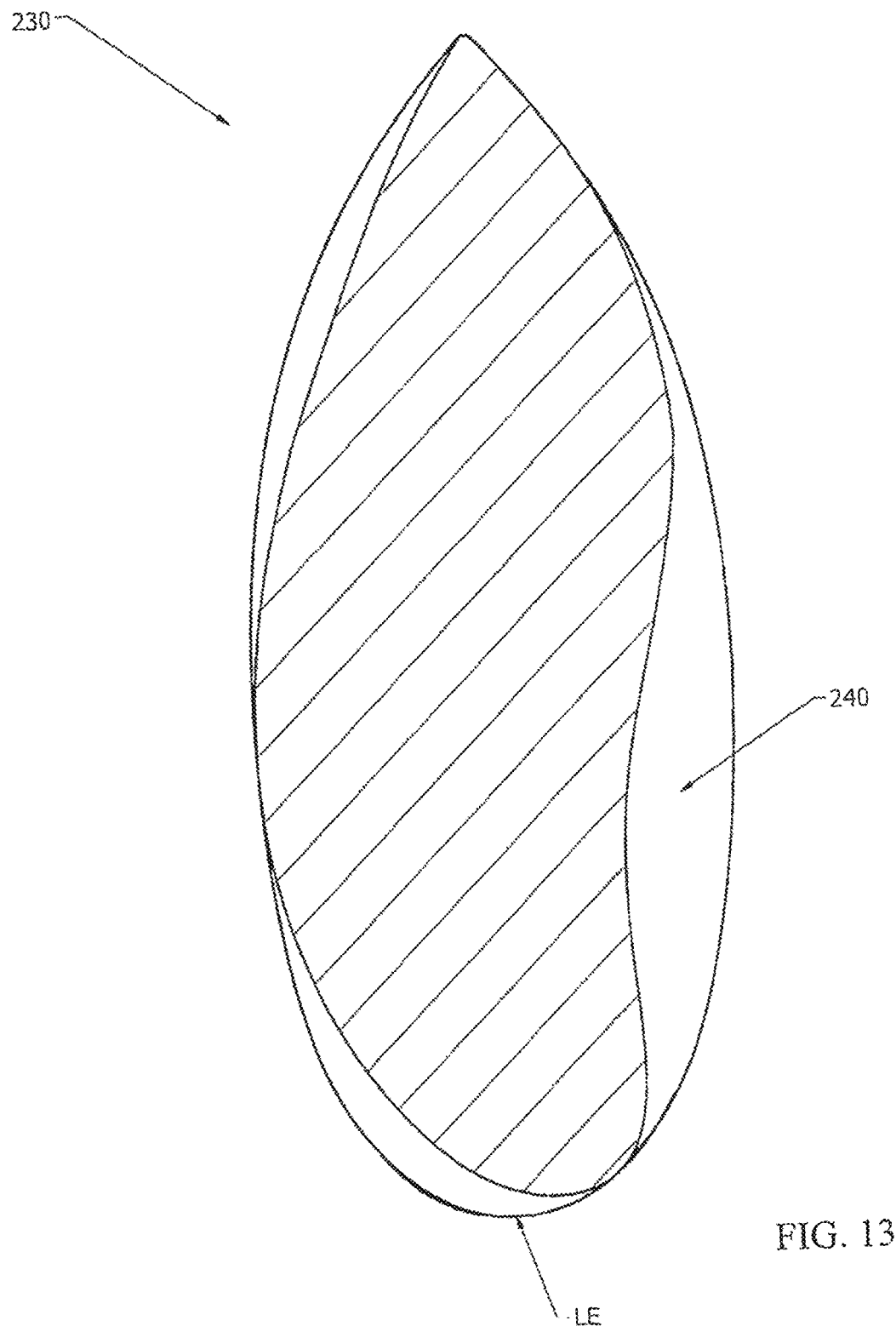
FIG. 13 is a cross-sectional view through the bicycle frame member of FIG. 10.
Figure 14:
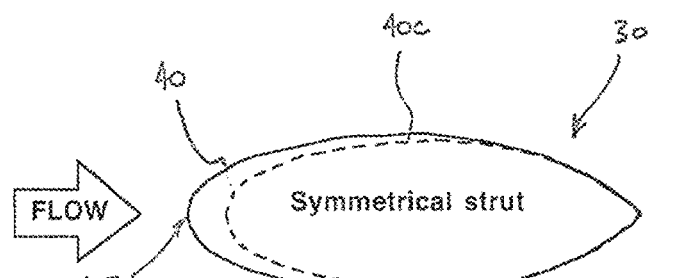
FIG. 14 is a further cross-sectional view through the bicycle frame member of FIG. 2.

Referring now to FIG. 1, where there is illustrated a bicycle 1 comprising a frame 10. The frame 10 comprises a plurality of frame members, where these include a top tube 12, a seat tube 14, a head tube 16, a down tube 18, a pair of chain stays 20, a pair of seat stays 22, and a pair of forks 24.

The bicycle 1 further comprises a seat post 30 supporting a seat 32, and a stem 34 supporting a set of handlebars 36.

Referring now to FIGS. 2 through 5 and 14, where there is shown a portion of a bicycle frame member according to a first embodiment. While the following description will relate to the seat post 30, the inventive concept is applicable to any one of the above described members, and particularly the members which present a significant cross-sectional area to airflow as the bicycle is moving, such as the seat post 30, the forks 24, the head tube 16, the seat tube 14 and the down tube 18.

While not illustrated in FIGS. 2 through 5, it will be understood that a lower end of the seat post 30 will be adapted for insertion into and securement to the seat tube 14 of the bicycle 1, and the upper end of the seat post 30 will be adapted for attachment of the seat 32 thereto.

The seat post 30 comprises a lengthwise extending leading edge LE, this being the foremost edge of the seat post 30 relative to the intended direction of travel of the bicycle 1, which is designed and intended to be ridden with the handlebars 36 forward.

The leading edge LE of the seat post 30 comprises a series of vortex generators 40 spaced apart lengthwise therealong. In this embodiment, each of these vortex generators 40 comprises a forwardly extending protrusion comprising a convex rounded form. That is to say, in one form each, of the vortex generators comprises a tubercle 40.

Each of the protrusions are spaced apart by valleys 50, where the transition between protrusions 40 and valleys 50 is smooth and curved. In one embodiment, the protrusions comprise an amplitude of 3 mm and a wavelength of 8 mm, but these dimensions may vary, with the amplitude and wavelength of the protrusions being scaled with the size of the frame member. In other words, small members will have small protrusions and large members will have large protrusions.

In this embodiment, each of the protrusions 40 and the valleys 50 extends either side of the leading edge LE, a part way around the seat post 30, and perpendicular to the direction of elongation of the seat post 30, to further form chordwise extending ribs 40C and valleys 50C.

Figure 25:
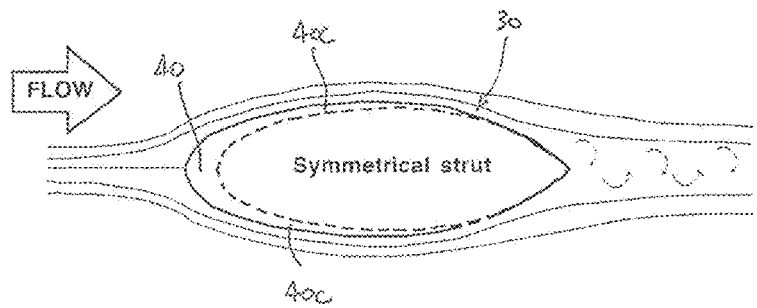
FIGS. 25 and 27 illustrate a flow pattern around the frame member of FIG. 14.

Referring now to FIG. 25, it can be seen how in use, the leading edge protrusions 40 and valleys 50 delay flow separation, keep the local flow attached for as long as possible, and thereby reduce the drag considerably. In fact, drag reductions equating to a power saving of 5.34 Watts have been determined for a race-speed of 54 kph, equating to a drag reduction of 1 to 1.5% for the rider/bicycle combination.

Figure 27:
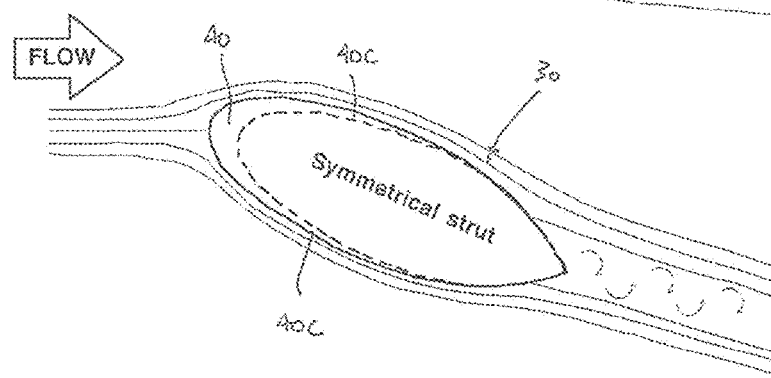

Moreover, and with reference to FIG. 27, it can be seen how the seat post 30 maintains low aerodynamic drag even when the flow (or yaw) angle exceeds 10°, and over the wide range of yaw angles experienced by a seat post of a bicycle, which have been found, by experiment, to be up to ±30° from a centreline of the bicycle 1.

Figure 28:
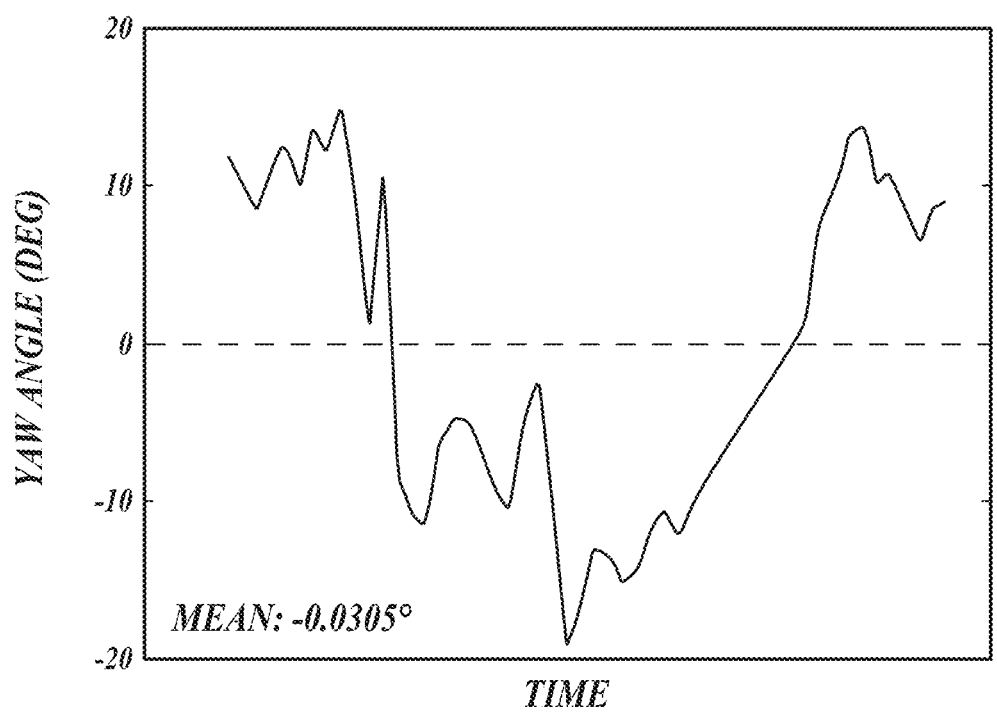
FIG. 28 is a table illustrating wind yaw angle versus time.

FIG. 28 is a table that illustrates wind yaw angle versus time during one pedalling cycle of a rider on a track bicycle on an indoor velodrome. The measurement was made immediately ahead of the bicycle seat post.

Figure 24:
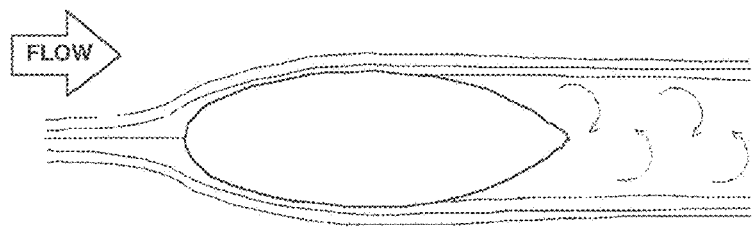
FIGS. 24 and 26 illustrate a flow pattern around a frame member of the prior art.

FIG. 24 shows a flow pattern around a standard frame member of the prior art, and illustrates the early separation of the boundary layer as air flows past the member at zero yaw angle. In comparison, FIG. 25 shows a flow pattern around the frame member of FIGS. 2 through 5 and 14, and illustrates the delayed flow separation produced in the same air flow conditions.

Figure 26:
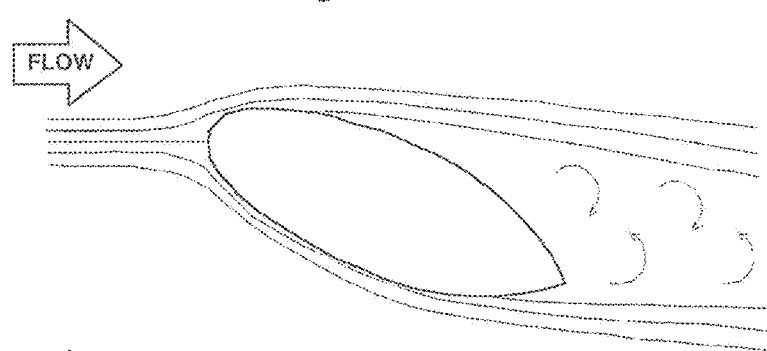

FIG. 26 shows a flow pattern around the standard frame member of FIG. 24, and illustrates the early separation of the boundary layer as air flows past the standard frame member at yaw angles above 15 degrees. In comparison, FIG. 27 shows the flow pattern around the frame member of FIGS. 2 through 5 and 14 at comparable yaw angles, and illustrates the delayed flow separation produced in the same air flow conditions. The delayed flow separation leads to lower drag.

Referring now to FIGS. 6 through 9, where there is illustrated a seat post 130 according to a further embodiment. Those parts of the seat post 130 which are identical (or near-identical) to corresponding parts shown in the seat post 30 of FIGS. 2 through 5, will be denoted by the same reference numerals and will not be described again in detail.

As can be seen in FIG. 1, in use, the seat post 130 will be supported with a rearward inclination, or sweep. That is, the leading edge LE sweeps rearward as seat post 130 extends upwards. Accordingly, for seat post 130, each of the protrusions 40 and the valleys 50 extends either side of the leading edge LE, a part way around the seat post 130, and parallel to the airflow, not perpendicular to the direction of elongation of the seat post 30.

Referring now to FIGS. 10 through 13, where there is illustrated a seat post 230 comprising leading edge protrusions 40 and valleys 50 as before, and chordwise extending ribs 240 and valleys 250, where the chordwise extending ribs 240 extend from leading edge valleys 50, and the chordwise extending valleys 250 extend from the leading edge protrusions 40.

Figure 15:
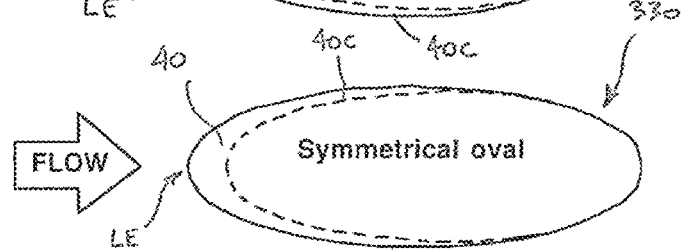
FIG. 15 is a cross-sectional view through a bicycle frame member according to a further embodiment.

Referring now to FIG. 15, where there is illustrated a seat post 330, which differs from seat post 30 in that it comprises a symmetrical, oval shaped cross-sectional profile with its thickest point disposed to a location approximately 50% along its chord.

Figure 16:
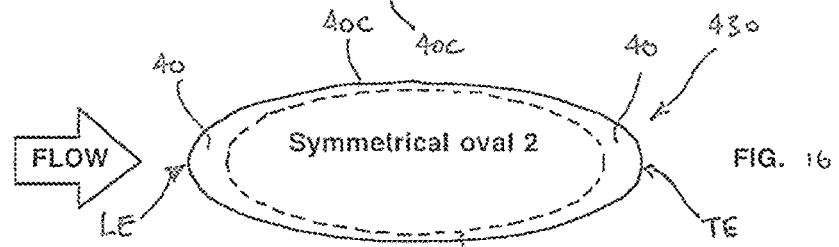
FIG. 16 is a cross-sectional view through a bicycle frame member according to a further embodiment.

Referring now to FIG. 16, where there is illustrated a seat post 430, which differs from seat post 330 in that it comprises protrusions 40 along a trailing edge TE also. Moreover, the chordwise extending ribs 40C bridge the protrusions 40 on the leading edge LE and the trailing edge TE.

Figure 17:
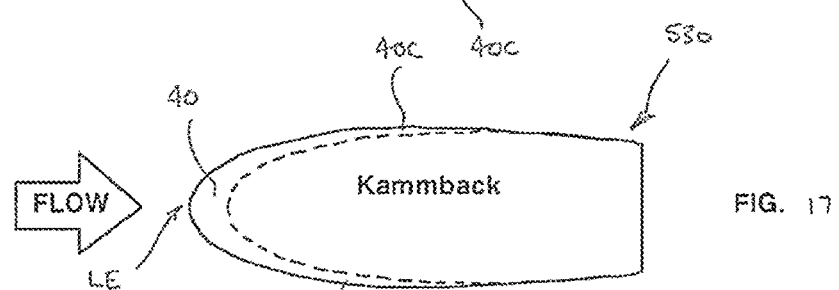
FIG. 17 is a cross-sectional view through a bicycle frame member according to a further embodiment.

Referring now to FIG. 17, where there is illustrated a seat post 530, which differs from seat post 30 in that it comprises a symmetrical D-shaped cross-sectional profile with its thickest point disposed to a location approximately 50% along its chord, and of the type commonly known as "Kammback" profile.

Figure 18:
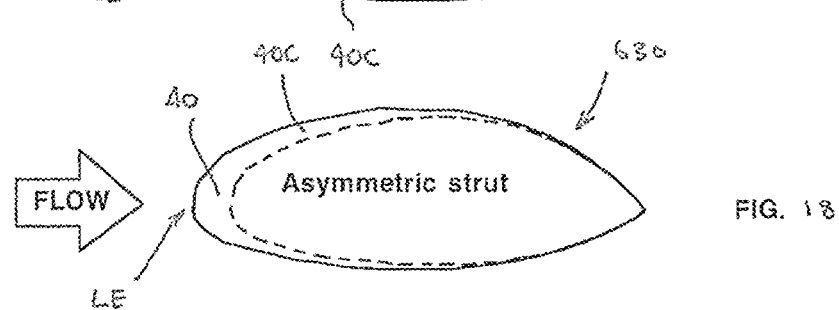
FIG. 18 is a cross-sectional view through a bicycle frame member according to a further embodiment.

Referring now to FIG. 18, where there is illustrated a seat post 630, which differs from seat post 30 in that it comprises an asymmetric cross-sectional profile with its thickest point disposed to a location between 25% and 60% along its chord. This profile is suited for front forks, where substantial flow asymmetry occurs.

Referring now to FIG. 19, where there is illustrated a seat post 730, which differs from seat post 30 in that an inner profile, as defined by the valleys 50 and chordwise extending valleys 50C, and indicated by the dashed lines, alternates between inner profiles IP1 and IP2, while an outer profile OP remains constant.

Referring now to FIG. 20, where there is illustrated a seat post 830, which differs from seat post 30 in that the outer profile, as defined by the protrusions 40 and chordwise extending protrusions 40C, and indicated by the solid lines, alternates between outer profiles OP1 and OP2, while the inner profile IP remains constant.

Referring now to FIG. 21, where there is illustrated a seat post 930, which differs from seat post 830 in that it has no inner profile.

Figure 22:
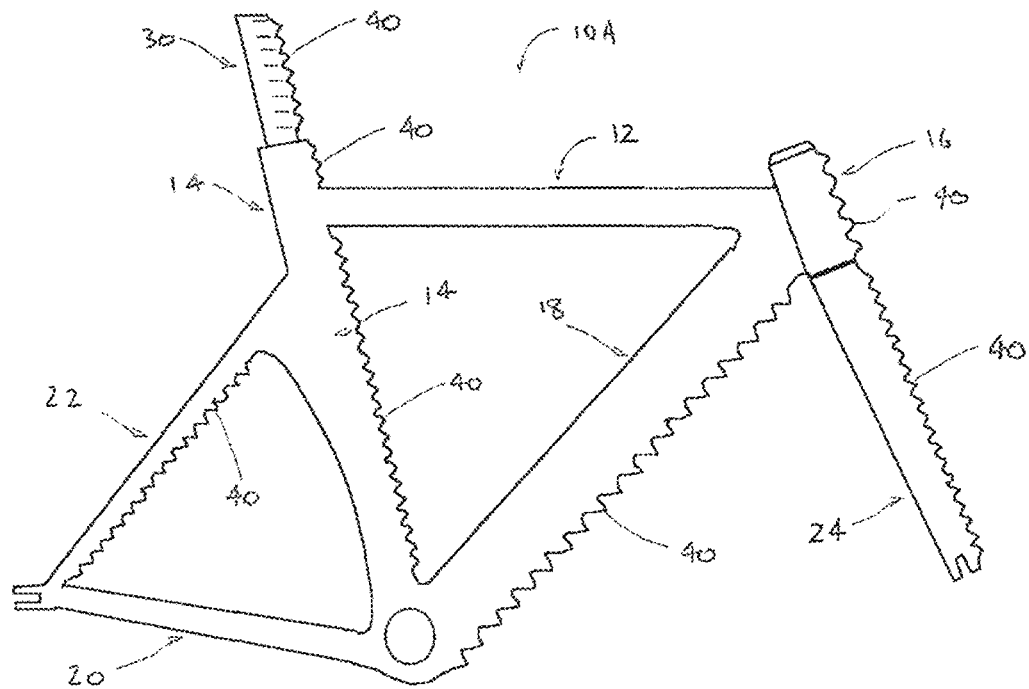
FIG. 22 is a side view of a bicycle frame according to a further embodiment.

Referring now to FIG. 22, where there is illustrated a bicycle frame 10A according to a further embodiment. As per the bicycle frame 10 of FIG. 1, the frame 10A comprises a top tube 12, a seat tube 14, a head tube 16, a down tube 18, a pair of chain stays 20, a pair of seat stays 22, a pair of forks 24 and a seat post 30. In this embodiment, each of the seat tube 14, the head tube 16, the down tube 18, the pair of seat stays 22, the pair of forks 24 and the seat post 30 comprise a leading edge LE comprising a series of the vortex generators (tubercles) 40 spaced apart lengthwise therealong.

Figure 23:
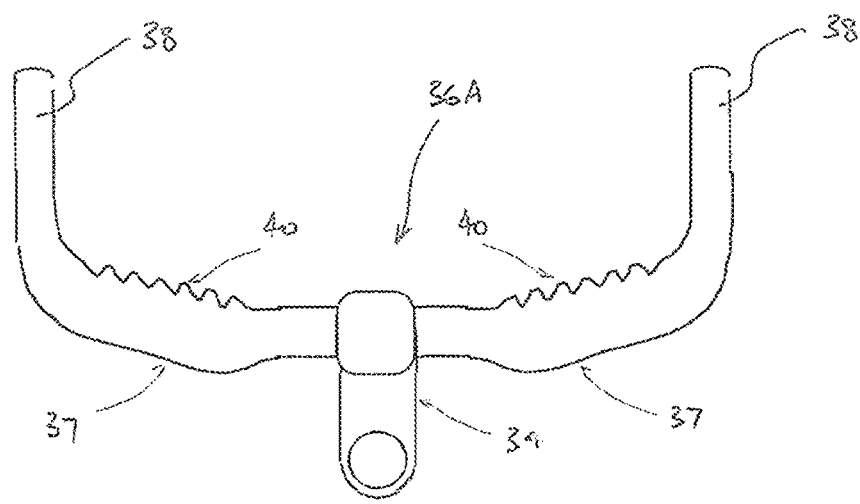
FIG. 23 is a plan view of a set of handlebars according to a further embodiment.

Referring now to FIG. 23, where there is illustrated a set of bicycle handlebars 36A according to a further embodiment. This set of handlebars 36A comprises a 'bar' 37 in the form of a cross-member which transitions at opposing ends thereof into a pair of 'drops' 38 (or forward-extending handles in the case of track pursuit bars or time-trial bars). In this embodiment, the bar 37 comprises a leading edge LE comprising a series of the vortex generators (tubercles) 40 spaced apart lengthwise therealong.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An elongate structural member of a bicycle frame, the structural member comprising a lengthwise extending leading edge having at least a pair of forwardly extending protrusions spaced apart lengthwise along the leading edge, wherein each of the protrusions extends to at least one side of the leading edge so as to transition into a chordwise extending rib.

2. The structural member of claim 1, wherein the leading edge comprises a series of the protrusions spaced apart lengthwise along the leading edge.

3. The structural member of claim 1, comprising an alternating pattern of the protrusions and spaces extending lengthwise along at least a portion of the leading edge.

4. The structural member of claim 1, wherein each pair of protrusions is separated by a valley.

5. The structural member of claim 4, wherein an alternating pattern of the protrusions and the valleys extends lengthwise along at least a portion of the leading edge.

6. The structural member of claim 5, wherein the pattern extends along an entirety of the leading edge.

7. The structural member of claim 4, wherein each of the valleys extends to a side of the leading edge so as to transition into a chordwise extending valley.

8. The structural member of claim 7, wherein each chordwise extending valley extends parallel to one of the chordwise extending ribs.

9. The structural member of claim 1, wherein each of the protrusions is aerodynamically shaped.

10. The structural member of claim 1, wherein each of the protrusions comprises a convex rounded form.

11. The structural member of claim 1, wherein each of the protrusions comprises a tubercle.

12. The structural member of claim 1, wherein each of the protrusions extends to both sides of the leading edge to transition into a pair of chordwise extending ribs.

13. The structural member of claim 1, wherein each of the chordwise extending ribs extends at least partially around the member.

14. The structural member of claim 1, wherein each of the chordwise extending ribs extends parallel to a direction of airflow when in use.

15. The structural member of claim 1, wherein the member comprises an aerofoil shaped cross-sectional profile.

16. The structural member of claim 1, wherein the member is selected from the group comprising a seat post, a head tube, a seat tube, a down tube, at least one of a pair of seat stays, and at least one of a pair of forks.

17. An elongate structural member of a bicycle frame, the structural member comprising a lengthwise extending leading edge having a plurality of convex, rounded protrusions spaced apart lengthwise along the leading edge, wherein each of the protrusions extends to at least one side of the leading edge so as to transition into a chordwise rib.

18. An elongate structural member of a bicycle frame, the structural member comprising a lengthwise extending leading edge having a plurality of protrusions spaced apart lengthwise along the leading edge, the protrusions selected from the group comprising tubercles, convex, rounded, and forwardly extending vortex generators, wherein each of the protrusions extends to at least one side of the leading edge so as to transition into a chordwise rib.

19. The structural member of claim 18, wherein the structural member is selected from the group consisting of a handlebar, a handlebar stem, and a seat post.

* * * * *